US010304136B1

(12) United States Patent
Payne

(10) Patent No.: US 10,304,136 B1
(45) Date of Patent: May 28, 2019

(54) METHOD AND SYSTEM FOR CONSTRUCTING APPROXIMATE MINIMUM VARIANCE PORTFOLIOS

(71) Applicant: Genesis Financial Development, Inc., Mississauga (CA)

(72) Inventor: Richard C. Payne, Mississauga (CA)

(73) Assignee: Genesis Financial Development, Inc., Mississauga, Ontario (CA)

( * ) Notice: Subject to any disclaimer, the term of this patent is extended or adjusted under 35 U.S.C. 154(b) by 486 days.

(21) Appl. No.: 14/589,240

(22) Filed: Jan. 5, 2015

Related U.S. Application Data

(60) Provisional application No. 61/968,586, filed on Mar. 21, 2014.

(51) Int. Cl.
*G06Q 40/06* (2012.01)

(52) U.S. Cl.
CPC .................... *G06Q 40/06* (2013.01)

(58) Field of Classification Search
CPC ............................. G06Q 40/00; G06Q 40/06
USPC ....................................................... 705/36 R
See application file for complete search history.

(56) References Cited

U.S. PATENT DOCUMENTS

| 7,580,876 B1* | 8/2009 | Phillips | G06Q 30/08 345/440 |
| 2009/0307149 A1* | 12/2009 | Markov | G06Q 40/00 705/36 R |

OTHER PUBLICATIONS

Petersen, Kaare, Michael Syskind Pedersen. "The Matrix Cookbook," available at: http://www2.imm.dtu.dk/pubdb/views/edoc_download.php/3274/pdf/imm3274.pdf, Nov. 15, 2012.
Bodie, Zvi, Alex Kane and ALan J. Marcus. "Investments," Irwin, (c) 1996), Section 7.4, "The Markowitz Portfolio Selection Model".
Best, Michael J., "Portfolio Optimization," University of Waterloo, Ontario, Canada, Taylor & Francis, (c) 2010), pp. 24-25.
Bernstein, William. J. "The Intelligent Asset Allocator," McGraw Hill, (c) 2001, pp. 50-51.

(Continued)

*Primary Examiner* — Robert R Niquette
*Assistant Examiner* — Liz P Nguyen
(74) *Attorney, Agent, or Firm* — Simpson & Simpson, PLLC

(57) ABSTRACT

A computer-based method for construction portfolios, including: populate an initial estimated portfolio covariance matrix; generate initial configurations by populating covariance matrices with randomly selected assets; determine scores for the initial configurations; calculate a first statistical function for the scores; select an initial configuration satisfying a criterion regarding the statistical function; generate iteration configurations by successively replacing one asset with a randomly selected asset; determining a score for each iteration configuration; calculate a second statistical function of the scores; calculate a statistical function of the first and second statistical functions; select a starting cooled configuration; generate modified cooled configurations by replacing one asset when a score for the modified cooled configuration satisfies a criterion; and when a score for a modified cooled configuration satisfies a criterion, save, in a memory unit, the assets and weights of dividend factors of assets for the cooled configuration as a recommended set of assets.

30 Claims, 5 Drawing Sheets

(56) References Cited

OTHER PUBLICATIONS

Haugen, Robert A. "Low Volatility Anomaly" (LVA); Value Man and Growth Man Too, The New Finance—The Case Against Efficient Markets, University of California, Irvine, Prentice Hall, Englewood Cliffs, New Jersey (c) 1995. pp. 84-92.

Soe, Aye M. And Xiaowei Kang, CFA. "Low Volatility Equity Investing," http://www.spindices.com/documents/presentations/20121106-global-webinar-spdji-kang-look-volatility.pdf, Nov. 6, 2012

Rowland, Ron. "Low Volatility Landscape Gets 4 New ETFs," http://seekingalpha.com/article/1230991-low-volatility-landscape-gets-4-new-etfs, Feb. 27, 2013.

"XSLV—PowerShares S&P SmallCap Low Volatility Portfolio," http://www.invescopowershares.com/products/overview.aspx?ticker=XSLV, Invesco Ltd, (c) 2015.

Haugen, Robert A. "Value Man and Growth Man Too" Value Man and Growth Man Too, The New Finance—The Case Against Efficient Markets, University of California, Irvine, Prentice Hall, Englewood Cliffs, New Jersey (c) 1995, pp. 84-92.

Campbell, John Y. And Luis M. Viceira. "Strategic Asset Allocation," Oxford University Press, (c) 2002), Chapter 3, esp. Figure 3.3.

SBBI (Stocks, Bonds, Bills, and Inflation) 2006 Yearbook (Ibbotson Associates, (c) 2006).

Hebner, Mark T. "Index Funds: The 12-Step program for Active Investors," IFA Publishing, (c) 2007, pp. 153.

Reilly, Frank K. And Keith C. Brown, Investment Analysis and Portfolio Management, 4th. ed. by Jerome B. Cohen, Edward D. Zinbarg, and Arthur Zeikel, (Richard D. Irwin Inc., Reilly & Brown (c) 1982 Chapter 4, Appendix B, pp. 2-32.

Demiguel, Victor, Lorenzo Garlappi and Raman Uppal. "Optimal Versus Naive Diversification: How Inefficient is the 1/N Portfolio Strategy?," (c) 2007 Oxford University Press, available at: http://faculty.london.edu/avmiguel/DeMiguel-Garlappi-Uppal-RFS.pdf, pp. 1915-1953.

Salamon, Peter, Paolo Sibani and Richard Frost. "Facts, Conjectures, and Improvements for Simulated Annealing," Society for Industrial and Applied Mathematics, Philadelphia, (c) 2002), pp. 19-21.

Press, William H., Saul A. Teukolsky, William T. Vetterling and Brian P. Flannery, Simulated annealing is also described in Numerical Recipes in C, 2nd ed., Cambridge University Press, (c) 1992), Section 10.9, pp. 444-447.

* cited by examiner

METHOD AND SYSTEM FOR CONSTRUCTING APPROXIMATE MINIMUM VARIANCE PORTFOLIOS

CROSS-REFERENCE TO RELATED APPLICATIONS

This application claims the benefit under 35 U.S.C. § 119(e) of U.S. Provisional Patent Application No. 61/968,586, filed Mar. 21, 2014, which application is incorporated herein by reference in its entirety.

TECHNICAL FIELD

The present disclosure relates to investment portfolio construction, and more specifically to efficient construction of approximate minimum variance portfolios using simulated annealing.

REFERENCE TO COMPUTER PROGRAM LISTING APPENDIX

The present application includes a computer program listing appendix. The appendix contains an ASCII text function of the computer program listing or sample file input data as follows:
aplsrc.txt 15 KB Modified Mar. 5, 2014

BACKGROUND

FIG. 1 illustrates the minimum variance frontier of risky assets. FIG. 1 is based on FIG. 7.10 from the Bodie reference described below. Conventional Mean-Variance Optimization (MVO), as pioneered by Harry Markowitz, is well-known and has been used to construct portfolios for the last half-century. For an exposition see, for example, *Investments*, by Zvi Bodie, Alex Kane, and Alan J. Marcus (Irwin, (c) 1996), Section 7.4, "The Markowitz Portfolio Selection Model". Also see *Portfolio Optimization*, by Michael J. Best, (Taylor & Francis, (c) 2010). Under MVO assumptions, higher risk is associated with higher returns, leading to the well-known "efficient frontier"

FIG. 2 illustrates the risk-return plot for two overlapping 20-year time periods. FIG. 2 is based on FIG. 4.6 of Bernstein reference described below. MVO is known to be unstable in practice: see, for example, The Intelligent Asset Allocator by William Bernstein, (McGraw Hill, (c) 2001). Some "hints" (constraints) usually must be supplied to prevent the algorithm from chasing asset sectors with recent high performance. Another practical consideration is that in many cases investors are limited to long-only positions, either because of difficulties in obtaining credit for short positions, or because short positions are forbidden by statute or by investment policy (e.g. in some retirement accounts and pension plans).

Despite the theory, results from historical data tell a different story. The so-called "Low Volatility Anomaly" (LVA) has been documented extensively. See for example *The New Finance—The Case Against Efficient Markets* by Robert A. Haugen, (Prentice-Hall, (c) 1995). Also see: http://www.spindices.com/documents/presentations/20121106-global-webinar-spdji-kang-look-volatility.pdf The data show that in many cases, a lower volatility stock portfolio is associated with higher returns: this is NOT what the well-known MVO risk/return tradeoff would have suggested.

After a number of years during which the existence, magnitude, and possible causes of the LVA have been debated, some recent ETF (Exchange-Traded Fund) offerings have been developed to market it. See for example: http://seekingalpha.com/article/1230991-low-volatility-landscape-gets-4-new-etfs and http://www.invescopowershares.com/products/overview.aspx?ticker=XSLV One suggestion for incorporating this phenomenon into practical portfolio construction (as advocated for example by Haugen, for example, in Chapter Six of his book, Section "Value Man and Growth Man Too") is to use MVO "top-down" to determine a broad stock vs. bond mix, but to then use a low-volatility criterion for detailed stock selection.

Alternatively, risk-aversion and time horizon considerations can also be used to determine the top-down asset mix. See "Strategic Asset Allocation" (John Y. Campbell and Luis M. Viceira, Oxford University Press, (c) 2002), Chapter 3, esp. FIG. 3.3.

Small-cap stocks are especially attractive in the context of portfolio construction since they have historically enjoyed a long-term performance advantage over large-cap stocks. See for example the *SBBI (Stocks, Bonds, Bills, and Inflation)* 2006 *Yearbook* (Ibbotson Associates, (c) 2006) which shows that over the period 1926-2005, the geometric mean return on large company stocks was 10.4%, while for small company stocks it was 12.6%, giving small-cap stocks a 2.2% annualized advantage.

FIG. 3 illustrates the effect of moving to lower- and higher-risk portfolios. FIG. 3 is based on FIG. 6.16 from Haugen and shows that the estimated annual advantage of a low-volatility portfolio (what Haugen refers to as the "efficient version") is about 1%, and so, assuming additivity, approximately 3.2% of excess annualized performance (on average) is achievable.

FIG. 4 illustrates value versus growth in the U.S. from 1927-2006. FIG. 4 is based on FIG. 8.20 of the Hebner reference described below. Depending on the data source, it may in fact be that the improvement in returns is more than additive. See for example *Index Funds: The 12-Step program For Active Investors*, by Mark T. Hebner, (IFA Publishing, (c) 2007). The data cited in the Hebner book shows that the large blend vs. small value performance over 1926-2006 is 10.65% vs. 14.50%, an annual performance differential of 3.85%. This expected level of outperformance is an extremely attractive prospect for the long-term investor. However, practical implementation of a true minimum-variance portfolio may be very difficult.

The variance of a portfolio can be computed from the covariance matrix and portfolio weights as shown in, for example *Investment Analysis and Portfolio Management*, 4th. ed. by Jerome B. Cohen, Edward D. Zinbarg, and Arthur Zeikel, (Richard D. Irwin Inc., (c) 1982) Chapter 4, Appendix B.

Seeking an unconstrained minimum variance solution may be unstable (i.e. may lead to large positive and negative weights) and require more data than can be easily assembled. For example, portfolio optimization (as described in e.g. equation 2.6 of Best) requires inversion of the asset return covariance matrix. However, it is well-known that an n-by-n covariance matrix based on fewer than n observations will be rank-deficient and hence not invertible, and that even with n or more observations the matrix may be singular or nearly singular.

Take for example the problem of finding a minimum variance portfolio for the Russell 2000 Index, which is based on performance data for approximately 2,000 small-cap stocks. If daily closing data is assembled for each stock, then under the assumption of 250 trading days per year, it will take at least eight years to assemble a full-rank covariance matrix. This period of time is longer than a typical business cycle, raising the possibility that by the time the data is collected, it may be too late to make timely investment decisions based on it.

Additionally, for all but the largest funds, maintaining a position in each of 2,000 stocks may be expensive, and so some kind of sampling approach (investing in only a subset of the 2,000 stocks) is necessary. A method based on picking a relatively small number of stocks for the portfolio and adding them incrementally to the portfolio could substantially reduce transaction costs.

An equal-weighting approach reduces the difficulty of the optimization problem, avoids unstable and wildly differing portfolio weights for stocks in the portfolio, and automatically constrains the portfolio to be long-only. It can also be justified on the basis that more sophisticated methods may give statistically-indistinguishable results unless measurement is over a very long timescale. See *Optimal Versus Naive Diversification: How Inefficient is the 1/N Portfolio Strategy?*, by Victor DeMiguel, Lorenzo Garlappi, and Raman Uppal, (c) 2007 Oxford University Press, available at: http://faculty.london.edu/avmiguel/DeMiguel-Garlappi-Uppal-RFS.pdf A refinement of the 1/N approach is to start with equal weights and then modify them within bounds (say 50% to 150% of the equal weights), to further reduce volatility. This "modified equal-weighting" approach avoids the unstable portfolio weights arising from an unconstrained minimization approach while making fuller use of the data, and is computationally within a constant factor of the amount of time it takes to determine the volatility of the 1/N portfolio.

But even after applying the equal-weighting approach or the modified equal-weighting approach, the solution space is very large. If we are selecting 50 equally-weighted stocks from a set of 500 (for example) with the objective of minimizing variance, there are $C(500,50)=2.3\times10^{69}$ combinations to consider, while if selecting 50 stocks from a set of 2000 there are $C(2000,50)=2.0\times10^{100}$. Clearly, exhaustive search of all possible combinations is impractical.

However, if there were a practical, even if approximate, solution to this problem, it could be iterated: pick the next-lowest variance basket of 50 stocks repeatedly until a stopping criterion (such as selection of 25% of all stocks in the original set) is satisfied.

Accordingly there is a long-felt need for a system allowing incremental construction of an approximate minimum-variance modified-equal-weight portfolio of size m, given an n by n possibly rank-deficient covariance matrix of asset returns, where m is less than n.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

SUMMARY

According to aspects illustrated herein, there is provided a computer-based method for construction of approximate minimum variance portfolios, including: storing computer executable instructions in a memory element of a computer; and executing, using a processor for the computer, the computer readable instructions to: obtain a plurality of asset return data for said each asset in a plurality of assets in a portfolio, the plurality of assets consisting of a first number of assets; populate an initial estimated portfolio covariance matrix with the plurality of assets; generate a plurality of initial configurations by populating respective covariance matrices with respective second numbers of randomly selected assets selected from the first plurality of assets and assigning at least one first respective financial parameter to respective assets included in the respective covariance matrices; determine respective first scores for the plurality of initial configurations; calculate a first statistical function of the respective first scores; select, from among the plurality of initial configurations, a first initial configuration satisfying a first criterion with respect to the first statistical function; generate a first iteration configuration by replacing at least one first asset in the selected initial configuration with at least one randomly selected second asset from the plurality of assets and assigning at least one second respective financial parameter to each asset included in the selected initial configuration; generate a plurality of iteration configurations by executing a first sequence including generating a respective iteration configuration by replacing, in an iteration configuration preceding the respective iteration configuration in the first sequence, at least one third asset with at least one randomly selected fourth asset from the plurality of assets and assigning the at least one second financial parameter to each asset included in the respective iteration configuration; determine respective second scores for the plurality of iteration configurations; calculate a second statistical function of the respective second scores; calculate a third statistical function of the first and second statistical functions; select, a first cooled configuration from among the plurality of iteration configurations, the first cooled configuration being an iteration configuration satisfying a second criterion with respect to the third statistical function; starting with the first cooled configuration, execute the following second sequence, determine a respective third score and generate a next cooled configuration in the second sequence by replacing, in a cooled configuration preceding the next cooled configuration in the second sequence, at least one fifth asset with at least one randomly selected sixth asset from the plurality of assets when the respective third score for the second cooled configuration satisfies a third criterion; and when a fourth score for a third cooled configuration satisfies a fourth criterion, save, in the memory unit, the assets and respective weights of the assets for the third cooled configuration as a recommended set of assets.

According to aspects illustrated herein, there is provided a computer-based method for construction of approximate minimum variance portfolios, including: storing computer executable instructions in a memory element of a computer; and executing, using a processor for the computer, the computer readable instructions to: obtain a plurality of asset return data for said each asset in a plurality of assets in said portfolio, the plurality of assets consisting of a first number of assets; populate an initial estimated portfolio covariance matrix; generate a plurality of initial configurations by successively populating respective covariance matrices with a second number of randomly selected assets included in the first plurality of assets and assigning first respective weights or first respective dividend factors to the randomly selected assets, the first respective dividend factors being measures of dividend returns of the second number of randomly selected assets; determine respective first scores for the initial configurations; calculate a first statistical function of the respective first scores; select, from among the plurality of initial configurations, an initial configuration satisfying a first criterion with respect to the first statistical function; generate, starting with the selected initial configuration, a plurality of iteration configurations by modifying an initial configuration by replacing a first asset with an asset from the plurality of assets and assigning second respective weights or second respective dividend factors to the modified iteration configurations, the second respective dividend factors being measures of dividend returns of assets in the modified iteration configuration; determining a respective second score for each iteration configuration according to a constraint limiting a sum of the weights for the modified configuration to one; calculate a second statistical function of the respective second scores; calculate a third statistical function of the first and second statistical functions; select, from among the plurality of iteration configurations, a starting cooled configuration satisfying a second criterion with respect to the third statistical function; generate, starting with the selected iteration configuration, a plurality of cooled configurations by modifying a first cooled configuration by replacing a second asset with an asset from the plurality of assets when a respective third score for the modified cooled configuration satisfies a third criterion; and when a fourth score for a first modified cooled configuration satisfies a fourth criterion, save, in the memory unit, the assets and respective weights of the assets for the cooled configuration as a recommended set of assets.

According to aspects illustrated herein, there is provided a computer-based apparatus for construction of approximate minimum variance portfolios, including: a memory element of a computer configured to store computer executable instructions; and a processor for the computer, configured to execute the computer readable instructions to: obtain a plurality of asset return data for said each asset in a plurality of assets in a portfolio, the plurality of assets consisting of a first number of assets; populate an initial estimated portfolio covariance matrix with the plurality of assets; generate a plurality of initial configurations by populating respective covariance matrices with respective second numbers of randomly selected assets selected from the first plurality of assets and assigning at least one first respective financial parameter to respective assets included in the respective covariance matrices; determine respective first scores for the plurality of initial configurations; calculate a first statistical function of the respective first scores; select, from among the plurality of initial configurations, a first initial configuration satisfying a first criterion with respect to the first statistical function; generate a first iteration configuration by replacing at least one first asset in the selected initial configuration with at least one randomly selected second asset from the plurality of assets and assigning at least one second respective financial parameter to each asset included in the selected initial configuration; generate a plurality of iteration configurations by executing a first sequence including generating a respective iteration configuration by replacing, in an iteration configuration preceding the respective iteration configuration in the first sequence, at least one third asset with at least one randomly selected fourth asset from the plurality of assets and assigning the at least one second financial parameter to each asset included in the respective iteration configuration; determine respective second scores for the plurality of iteration configurations; calculate a second statistical function of the respective second scores; calculate a third statistical function of the first and second statistical functions; select, a first cooled configuration from among the plurality of iteration configurations, the first cooled configuration being an iteration configuration satisfying a second criterion with respect to the third statistical function; starting with the first cooled configuration, execute the following second sequence to determine a respective third score and generate a next cooled configuration in the second sequence by replacing, in a cooled configuration preceding the next cooled configuration in the second sequence, at least one fifth asset with at least one randomly selected sixth asset from the plurality of assets when the respective third score for the second cooled configuration satisfies a third criterion and when a fourth score for a third cooled configuration satisfies a fourth criterion, save, in the memory unit, the assets and respective weights of the assets for the third cooled configuration as a recommended set of assets.

BRIEF DESCRIPTION OF THE DRAWINGS

The nature and mode of operation of the present disclosure will now be more fully described in the following detailed description of the present disclosure taken with the accompanying figures, in which.

DETAILED DESCRIPTION

Figure 1:
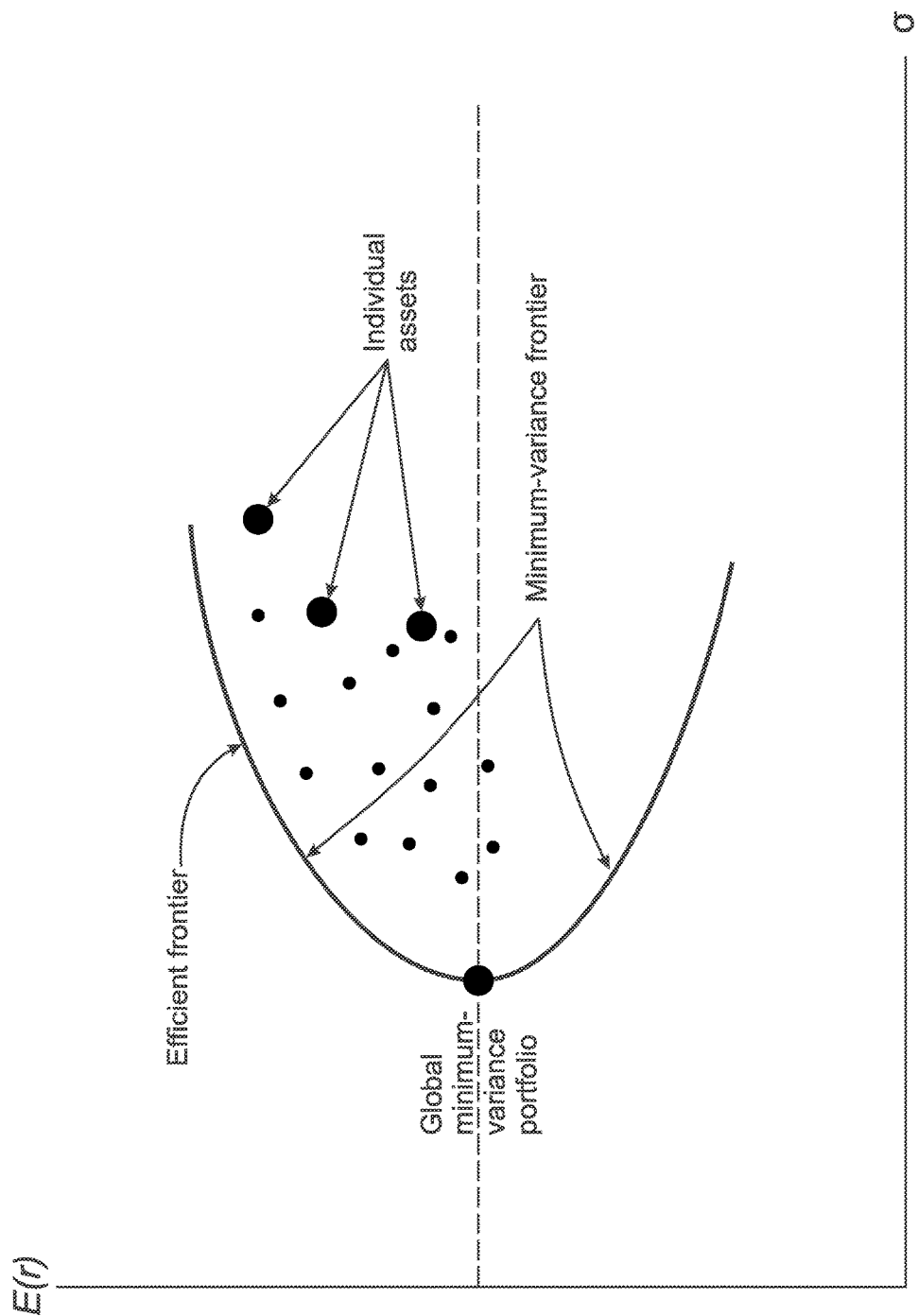
FIG. 1 illustrates the minimum variance frontier of risky assets.
Figure 2:
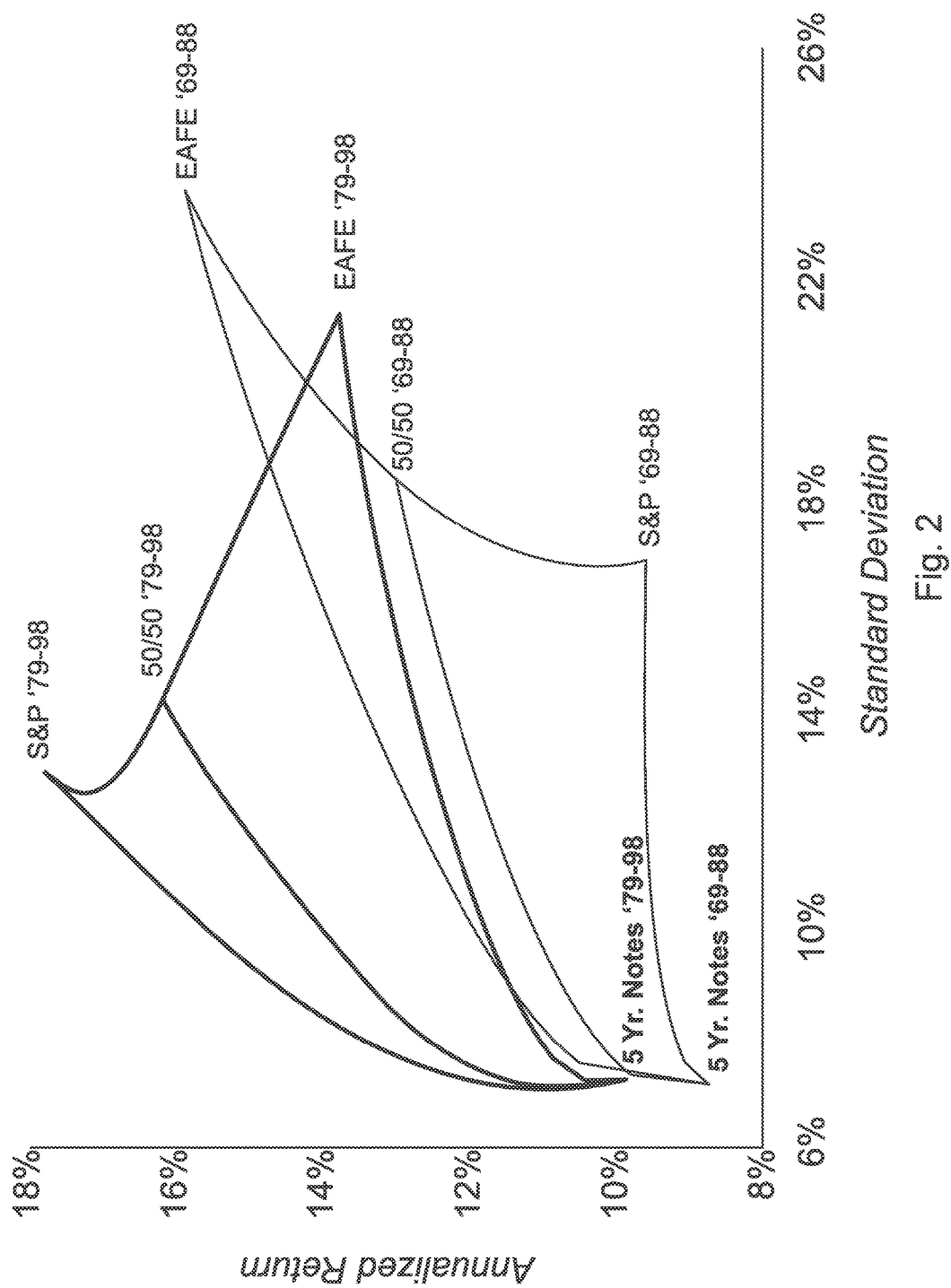
FIG. 2 illustrates the risk-return plot for two overlapping 20-year time periods.
Figure 3:
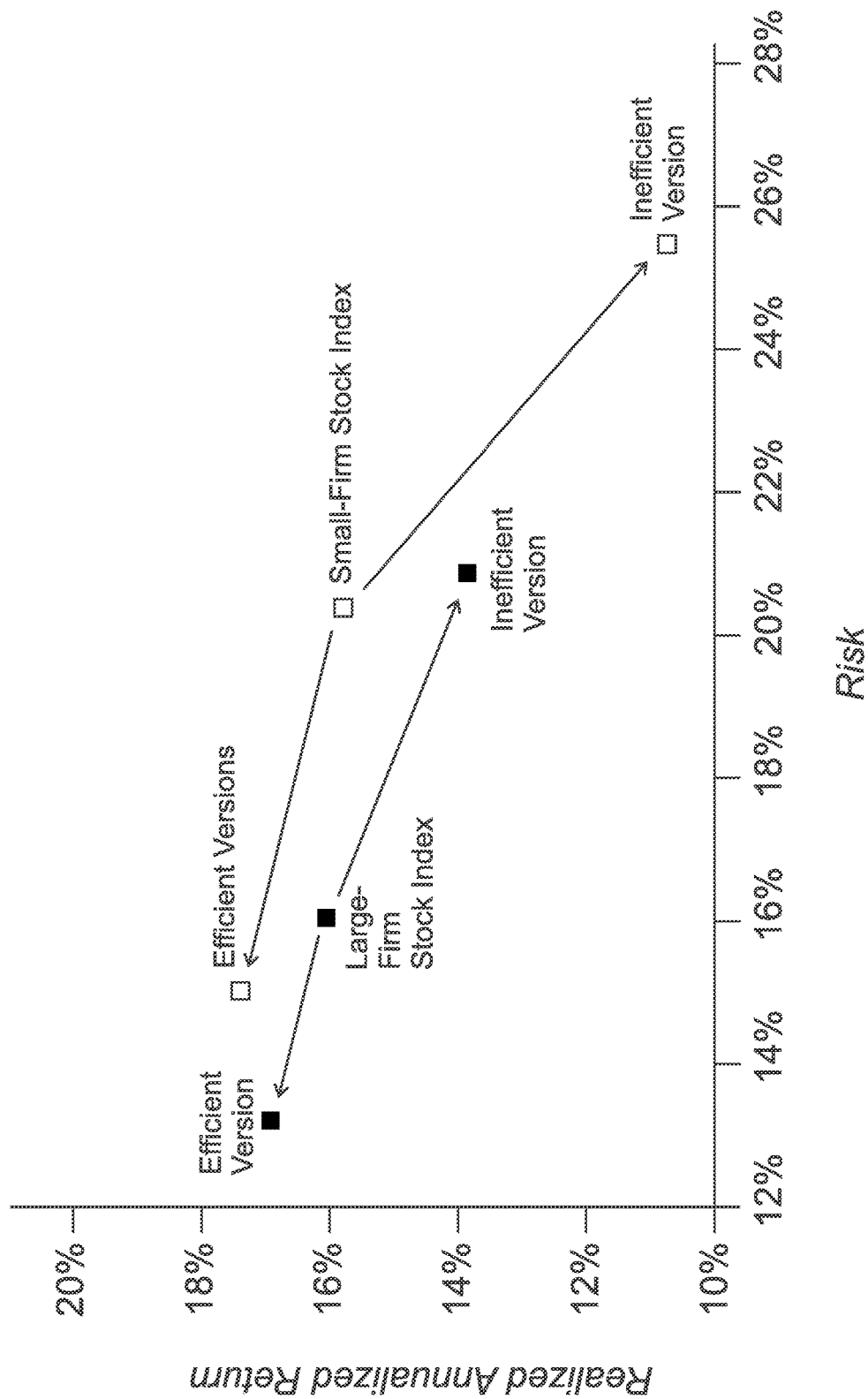
FIG. 3 illustrates the effect of moving to lower- and higher-risk portfolios.
Figure 4:
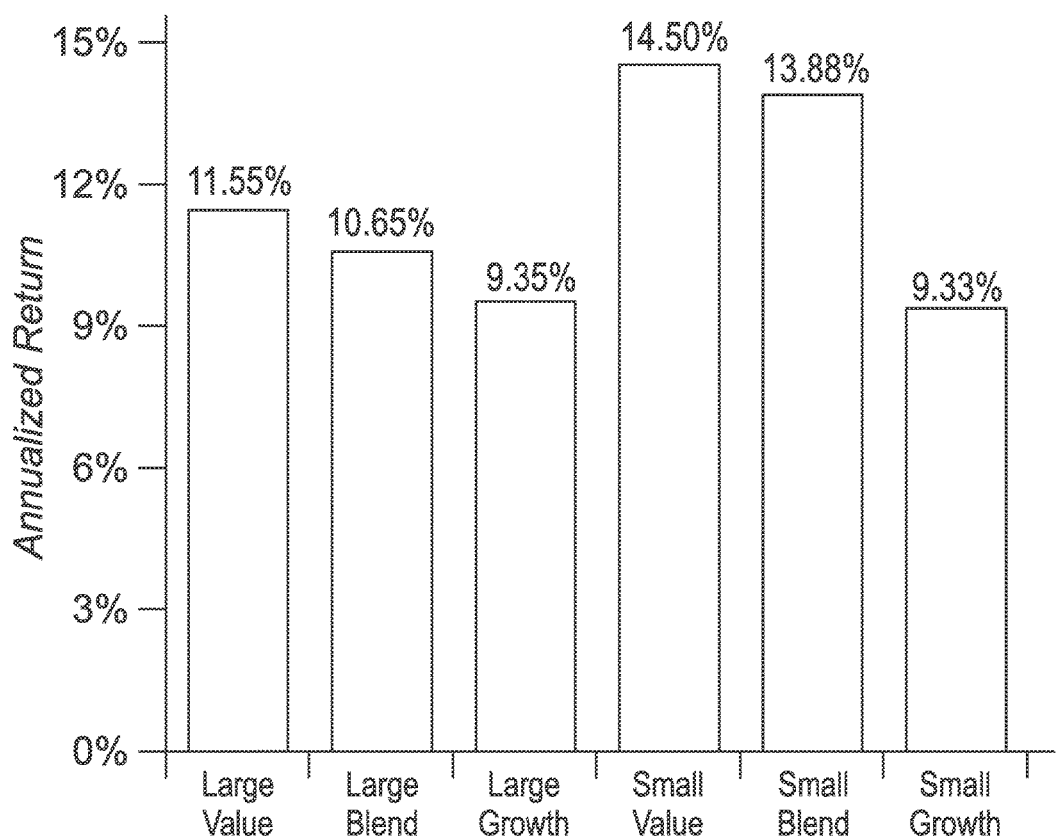
FIG. 4 illustrates value versus growth returns in the U.S. from 1927-2006.

In the present disclosure, portfolio variance is minimized using a simulated annealing process. It should be understood that other investment criteria can be modified using the simulated annealing process of the present disclosure to achieve other investment goals. Such goals include minimizing expected tracking error of the portfolio with respect to an index, or minimizing tracking error while giving greater weights to stocks with higher dividend payouts.

As noted above, the approach of picking an equal-weight subset of stocks minimizing variance can be refined by adjusting the weights, within specified bounds, to achieve further variance reduction. For example, if 50 stocks are to be selected, the bounds are 50% and 150% of the equal weight allocation, and the amount available for investment, net of transaction costs, is $100,000, then between $1,000 and $3,000 will be allocated to each selected stock.

One of the simplest approaches to multivariate minimization is the steepest descent method, in which minimization is achieved by repeatedly taking "downhill steps" reducing the objective function as much as possible. This is done by moving in the opposite direction from the gradient, since it is well-known that the gradient direction is the direction in which the function value increases most rapidly. It is also well-known that for a symmetric matrix M the gradient of $x'Mx$ is $2Mx$ (see Section 2.4.2, equation (85) of The Matrix Cookbook, by Kaare Brandt Petersen and Michael Syskind Pedersen, available at: http://www2.imm.dtu.dk/pubdb/views/edoc_download.php/3274/pdf/imm3274.pdf for example). Since, once a subset of stocks has been selected, the computation of the variance for the subset is of the form $x'Mx$, where $x$ is the weight vector, taking one steepest descent step from the 1/N allocation is a practical method for achieving the additional variance reduction.

Simulated annealing is well-known and is described in *Facts, Conjectures, and Improvements for Simulated Annealing* by Peter Salamon, Paolo Sibani, and Richard Frost, (SIAM, (c) 2002). Simulated annealing is also described in *Numerical Recipes in C*, 2nd ed., by William H. Press, Saul A. Teukolsky, William T. Vetterling, and Brian P. Flannery, (Cambridge University Press, (c) 1992), Section 10.9.

Simulated annealing is a function minimization method based on an analogy with the process of annealing as used in metallurgy. It has been well-known for many centuries that metal alloys display different physical properties (tensile strength, ductility) depending on whether the hot alloy is cooled rapidly ("quenched") or slowly ("annealed"). In simulated annealing, the energy of the system corresponds to the value of an objective function to be minimized.

The following provides further detail regarding a method of operation and a function listing. The function "anneal3" is the top-level function in the APL workspace track2i Functions in the workspace (and brief description of each function) are as follows:

1. anneal3—finds an approximate minimum-variance modified-equal-weight portfolio for a given set of assets. The main steps in the method are as follows:
   a) Construct the covariance matrix.
   b) Apply simulated annealing using the following steps:
      i) generate an initial portfolio configuration;
      ii) generate updated portfolio configurations with the objective of starting in a generic (not special-case) configuration
      iii) generate updated portfolio configurations to determine the natural scale of variations in the configuration scores; and
      iv) apply a gradual "cooling schedule" such that there is a decreasing probability that the system will move uphill (i.e. to a configuration with a higher score).
   c) Display the final portfolio configuration and associated summary statistics.
2. calcScore—calculates the score function (objective function) for a portfolio configuration.
3. cent—centers and scales a data matrix by subtracting the mean for each column from each item in the column, and dividing each resulting item by the standard deviation for the column.
4. corr—calculates correlation coefficients for a data matrix.
5. fillZerosLoose—fills out a vector by replacing initial zeroes with the first non-zero element, other zeros with the previous non-zero element.
6. floyd—use a vectorized version of Floyd's algorithm to generate a number of random combinations at a time.
7. getCsvFile—gets data from a simple CSV file containing numbers and unquoted strings, dropping a specified number of header lines.
8. getDivs—creates a vector of dividend yields from the 'tickers.txt' file.
9. getModEwCorr—calculates the correlation coefficient between an equal-weight and a modified equal weight portfolio.
10. getModEwVar—calculates the variance and weights for a modified equal-weight portfolio. The method is as follows:
   a) Find the variance for the equal weight portfolio;
   b) Calculate the point in the downhill gradient direction minimizing the variance and check whether the weights are within the weight bounds (i.e. whether the minimizing point is feasible);
   c) If necessary, because the point is infeasible, calculate the point in the downhill gradient direction that minimizes variance while satisfying the weight bounds.
   d) Return the variance and weight.
11. getFile—reads an ASCII file as a vector of characters.
12. getTickers—creates a matrix of ticker symbols from the 'tickers.txt' file.
13. jd—converts a vector of dates in YYYYMMDD format to Julian dates.
14. lowercase—converts uppercase letters A-Z to lowercase letters a-z.
15. makeCov—makes a covariance matrix based on the data series for each of the stocks in the available set.
16. makeInitConfig—makes an initial portfolio configuration by randomly selecting stocks from the available set.
17. makeNewConfig—makes a new portfolio configuration from an old one by randomly selecting a stock to change, and changing it to a random stock not currently in the configuration.
18. makeUnits—returns a matrix of values, with a column for each available stock, and with zero representing missing or unavailable values.
19. mean—calculates mean for a data matrix.
20. msd—calculates mean and standard deviation for a data matrix.
21. sort—given a vector x, return a vector with the elements of x in ascending order.
22. unit—given a vector x, return a unit vector in the same direction.
23. vecFromLine—makes a nested vector from a line of text in which literals are known to be unquoted.

Figure 5:
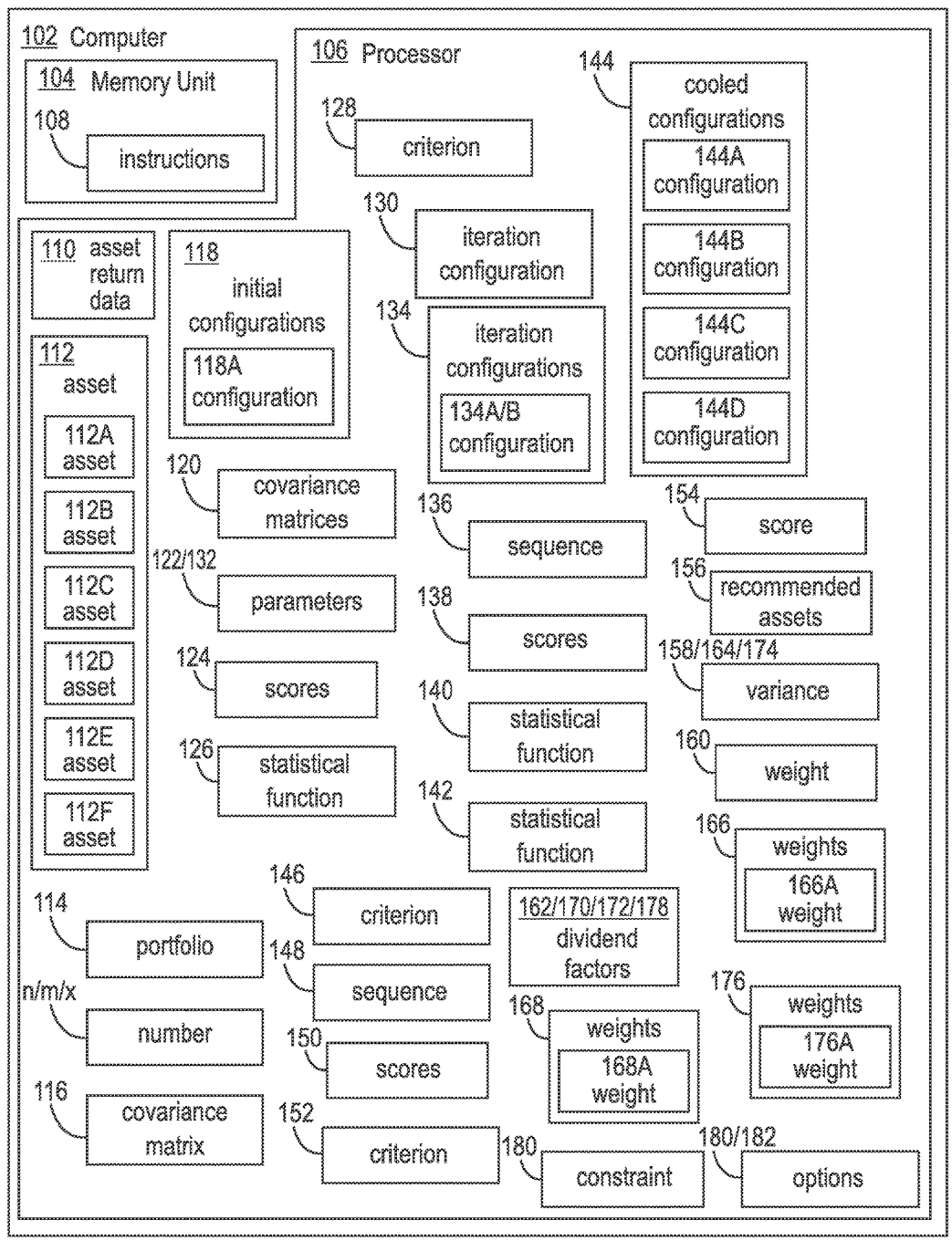
FIG. 5 is a schematic block diagram of a computer-based apparatus for adaptive construction of a portfolio.

FIG. 5 is a schematic block diagram of computer-based apparatus 100 construction of approximate minimum variance portfolios. Apparatus 100 includes computer 102 with memory element 104 and processor 106. Memory element 104 is configured to store computer executable instructions 108. Processor 106 is configured to execute instructions 108 to: obtain asset return data 110 for said each asset 112 in portfolio 114. Portfolio consists of n number of assets 112. Processor 106 is configured to execute instructions 108 to: populate initial estimated portfolio covariance matrix 116 with assets 112; and generate initial configurations 118 by populating respective covariance matrices 120 with m number of randomly selected assets 112 and assign at least one respective financial parameter 122 to respective assets 112 included in respective covariance matrices 120. In an example embodiment, m is less than n.

Processor 106 is configured to execute instructions 108 to: determine respective scores 124 for initial configurations 118; calculate statistical function 126 of scores 124; and select, from among of initial configurations 118, initial configuration 118A satisfying criterion 128 with respect to statistical function 126. Processor 106 is configured to execute instructions 108 to generate iteration configuration 130 by: replacing at least one asset 112A in selected initial configuration 118A with at least one randomly selected asset 112B not already included in configuration 118A; and assign at least one financial parameter 132, to each asset 112 included in selected initial configuration 118A. In an example embodiment parameters 122 and 132 are the same. In an example embodiment, parameters 122 and 132 are partially or wholly different from each other. Processor 106 is configured to execute instructions 108 to generate iteration configurations 134 by executing sequence 136. Sequence 136 includes generating a respective iteration configuration 134A by replacing, in iteration configuration 134B preceding respective iteration configuration 134A in sequence 136, at least one asset 112C with at least one randomly selected asset 112D and assigning a respective parameter 132, to each asset 112 included in respective iteration configuration 134A.

Processor 106 is configured to execute instructions 108 to: determine respective scores 138 for iteration configurations 130 with respect to parameters 132. Processor 106 is configured to execute instructions 108 to: calculate statistical function 140 of scores 138; calculate statistical function 142 of statistical functions 126 and 140; and select cooled configuration 144A from among iteration configurations 130. Cooled configuration 144A is an iteration configuration 130 satisfying criterion 146 with respect to statistical function 140.

Processor 106 is configured to execute instructions 108 to, starting with cooled configuration 144A, execute sequence 148 as follows: determine respective score 150 with respect to parameters 132; and generate a next cooled configuration 144B in sequence 148 by replacing, in cooled configuration 144C preceding next cooled configuration 144B in sequence 148, at least one asset 112E with at least one randomly selected asset 112F when the respective score 150 for cooled configuration 144B satisfies criterion 152. When score 154 for cooled configuration 144B satisfies criterion 154, processor 106 is configured to execute instructions 108 to save, in the memory unit, assets 112 and parameters 132 for cooled configuration 144B as a recommended set of assets 156.

Each row in initial estimated portfolio covariance matrix 116 represents an asset from assets 112. Each column in the initial estimated portfolio covariance matrix 116 represents an asset from assets 112. Each entry in initial estimated portfolio covariance matrix 116 is respective covariance of a return of an asset 112 represented in a respective row with respect to a return of another asset 112 represented in a respective column.

In an example embodiment, determining score 124 for each initial configuration 118 includes determining respective variance 158 for each initial configuration 118. In an example embodiment, assigning at least one respective financial parameter 122 includes assigning respective initial portfolio weights 160 to respective assets 122 included in the respective covariance matrices 116. In an example embodiment, assigning at least one respective financial parameter 122 includes assigning a respective dividend factor 162 to each asset 112 included in each matrix 116. The respective dividend factor 162 is a measure of a dividend return of the asset 112.

In an example embodiment, determining respective scores 138 for each iteration configuration 130 includes determining respective variance 164 for each iteration configuration 130. In an example embodiment, assigning at least one respective financial parameter 132 to each asset 112 included in selected initial configuration 118A includes assigning a respective weight 166A, from range of weights 166, to each asset 112 included in selected initial configuration 118A. In an example embodiment, assigning at least one respective financial parameter 132 to each asset 112 included in a respective iteration configuration 130 includes assigning a respective weight 168A, from range of weights 168, to each asset 112 included in the respective iteration configuration 130. In an example embodiment, assigning at least one respective financial parameter 132 to each asset 112 included in selected initial configuration 118A includes assigning a respective dividend factor 170 to each asset 112 included in selected initial configuration 118A. In an example embodiment, assigning at least one respective financial parameter 132 to each asset 112 included in a respective iteration configuration 130 includes assigning a respective dividend factor 172 to each asset 112 included in each iteration configuration 130. The respective dividend factors 170 and 172 are measures of dividend returns of assets 112.

In an example embodiment, determining respective scores 150 includes determining respective variance 174 for each cooled configuration 146. In an example embodiment, the processor is configured to execute instructions 108 to assign a respective weight 176A, from range of weights 176, to each asset 112 included in next cooled configuration 144B. Weights 160, 166A, 168A, and 176A can be the same or can be partially or wholly different from each other. Weights 160, 166, 168, and 176 can be the same or can be partially or wholly different from each other. In an example embodiment, the processor is configured to execute instructions 108 to assign respective dividend factor 178 to each asset 112 included next cooled configuration 146B. The respective dividend factor 178 is a measure of a dividend return of the asset 112. Dividend factors 162, 170, 172, and 178 can be the same or can be partially or wholly different from each other.

In an example embodiment, determining respective score 138 includes determining respective score 138 according to constraint 180 limiting respective sums of weights 166A and 168A to one. In an example embodiment, determining respective score 150 includes determining respective score 150 according to constraint 180 limiting respective sums of weights 176A to one.

In an example embodiment, satisfying criterion 152 includes score 150 of next cooled covariance matrix 144B being less than score 150 of cooled configuration 144C preceding next cooled configuration 144B in sequence 148. In an example embodiment, satisfying criterion 152 includes score 150 of next cooled covariance matrix 144B being greater than score 150 of cooled configuration 144C preceding next cooled configuration 144B in sequence 148

In an example embodiment, satisfying criterion 152 includes depending on number x of completed sequences 148. According to x: option 182 includes score 150 of next cooled covariance matrix 144B being less than score 150 of cooled configuration 144C preceding next cooled configuration 144B in sequence 148; and option 184 includes score 150 of next cooled covariance matrix 144B being greater than score 150 of cooled configuration 144C preceding next cooled configuration 144B in sequence 148. In an example embodiment as x increases, processor 106 is configured to execute instructions 108 to select option 182 with decreasing frequency.

By "configuration" we mean a covariance matrix and any additional parameters associated with the matrix, for example, weights 160, 166, 168, and 176 or dividend factors 170, 172, and 178. In an example embodiment, dividend factors 170, 172, and 178 influence an amount of an asset included in a particular matrix. For example, assets with greater dividend returns could be favored. A "score" for a configuration can include the variance for the matrix and accounts for financial parameters 122 and 132, for example, the weights and/or dividend factors, described above, associated with the configuration.

It should be understood that numbers n, m, and x are not limited to any particular values. In an example embodiment, weights 160 are equal to 1/m. In an example embodiment, some or all of weights 166, 168, and 176 include respective ranges less than and greater than 1/m. In an example embodiment, some or all of respective weights 166, 168, and 176 are centered about 1/m.

Scores 124 represent a first phase, or initial assessment, of the operations needed to identify the desired assets and asset parameters, such as weights. Function 126 can be any statistical function known in the art. Criterion 128 can be any criterion known in the art. For example, function 126 can be the standard deviation of matrices 120 and criterion 128 can be ½ the standard deviation. Thus, as a starting point for a second phase of the operation for apparatus 100, initial configuration 118A is identified as being the most favorable of configurations 118.

The second phase of operations for apparatus 100, involving iteration configurations 130, starts with configuration 118A, but randomly replaces assets 112 in configurations 130. In an example embodiment, one asset 112 is replaced at a time for each iteration configuration 130; however, it should be understood that other numbers of assets can be replaced at a time.

Functions 140 and 142 can be any statistical functions known in the art. Thus, as a starting point for a third phase of the operation for apparatus 100, cooled configuration 144A is identified as being the most favorable of configurations 130. In general, operations on cooled configurations 144 are designed to result in successive configurations 144 reducing variability of assets included in configurations 144—this is simulated annealing or cooling. As an analogy, operations for apparatus 100 begin at the top of a hill (high variability) and the ideal goal is to proceed downhill toward an optimally lowest asset variability at a foot of the hill. For example, criterion 152 includes score 150 of next cooled covariance matrix 144B being less than score 150 of cooled configuration 144C preceding next cooled configuration 144B in sequence 148. At the bottom of the hill (lowest variance) every possible cooled configuration 144 would fail the test of criterion 152 including score 150 of next cooled covariance matrix 144B being less than score 150 of cooled configuration 144C preceding next cooled configuration 144B in sequence 148. That is, every possible configuration 144 would go "uphill."

However, to prevent configurations 144 from settling into a local, rather than a global minimum (part way down the slope), at periodic intervals, criterion 152 includes score 150 of next cooled covariance matrix 144B being greater than score 150 of cooled configuration 144C preceding next cooled configuration 144B in sequence 148. Thus, a cooled configuration is allowed to go "uphill" enough to climb out of the local minimum and continue downhill. As apparatus 100 proceeds further in the annealing process of configurations 144, the frequency with which cooled configurations are allowed to go "uphill" decreases.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A computer-based method for construction of approximate minimum variance portfolios, comprising:
   storing computer executable instructions in a memory element of a computer; and,
   executing, using a processor for the computer, the computer readable instructions to:
   obtain a plurality of asset return data for said each asset in a plurality of assets in a portfolio, the plurality of assets consisting of a first number of assets;
   populate an initial estimated portfolio covariance matrix with the plurality of assets;
   generate a plurality of initial configurations by:
      populating respective covariance matrices with respective second numbers of randomly selected assets selected from the first plurality of assets; and,
      assigning at least one first respective financial parameter to respective assets included in the respective covariance matrices;
   determine respective first scores for the plurality of initial configurations;
   calculate a first statistical function of the respective first scores;
   select, from among the plurality of initial configurations, a first initial configuration satisfying a first criterion with respect to the first statistical function;
   generate a first iteration configuration by:
      replacing at least one first asset in the selected initial configuration with at least one randomly selected second asset from the plurality of assets; and,
      assigning at least one second respective financial parameter to each asset included in the selected initial configuration;
   generate a plurality of iteration configurations by executing a first sequence including generating a respective iteration configuration by replacing, in an iteration configuration preceding the respective iteration configuration in the first sequence, at least one third asset with at least one randomly selected fourth asset from the plurality of assets and assigning the at least one second financial parameter to each asset included in the respective iteration configuration;
   determine respective second scores for the plurality of iteration configurations;
   calculate a second statistical function of the respective second scores;
   calculate a third statistical function of the first and second statistical functions;
   select a first cooled configuration from among the plurality of iteration configurations, the first cooled configuration being an iteration configuration satisfying a second criterion with respect to the third statistical function;
   starting with the first cooled configuration, execute the following second sequence:
      determine a respective third score; and,
      generate a next cooled configuration in the second sequence by replacing, in a cooled configuration preceding the next cooled configuration in the second sequence, at least one fifth asset with at least one randomly selected sixth asset from the plurality of assets when the respective third score for the second cooled configuration satisfies a third criterion; and,
   when a fourth score for a third cooled configuration satisfies a fourth criterion, save, in the memory unit, the assets and respective weights of the assets for the third cooled configuration as a recommended set of assets.

2. The computer-based method of claim 1, wherein:
the at least one first financial parameter includes the at least one second financial parameter; or, the at least one second financial parameter includes the at least one first financial parameter.

3. The computer-based method of claim 1, wherein determining the first score for said each initial configuration includes determining a respective variance for said each initial configuration.

4. The computer-based method of claim 1, wherein assigning the at least one first respective financial parameter to the respective assets included in the respective covariance matrices includes assigning respective initial portfolio weights to the respective assets included in the respective covariance matrices.

5. The computer-based method of claim 4, wherein each respective portfolio weight is equal to one divided by the second number.

6. The computer-based method of claim 1, wherein:
assigning the at least one first respective financial parameter to the respective assets included in the respective covariance matrices includes assigning a respective dividend factor to the respective assets included in the respective covariance matrices; and,
the respective dividend factors are measures of dividend returns of the respective assets.

7. The computer-based method of claim 1, wherein determining the respective second scores for the plurality of iteration configurations includes determining a respective variance for said each iteration configuration.

8. The computer-based method of claim 1, wherein:
assigning the at least one second respective financial parameter to said each asset included in the selected initial configuration includes assigning a respective first weight, from a range of weights, to said each asset included in the selected initial configuration; and,
assigning the at least one second financial parameter to said each asset included in the respective iteration configuration includes assigning a respective second weight, from the range of weights, to said each asset included in the respective iteration configuration.

9. The computer-based method of claim 8, wherein determining the respective second scores for the plurality of iteration configurations includes determining the respective second scores according to a constraint limiting a sum of the weights to one.

10. The computer-based method of claim 1, wherein:
assigning the at least one second respective financial parameter to said each asset included in the selected initial configuration includes assigning a first respective dividend factor to said each asset included in the selected initial configuration;
assigning the at least one second financial parameter to said each asset included in the respective iteration configuration includes assigning a second respective dividend factor to said each asset included in the respective iteration configuration;
the first respective dividend factor is a measure of dividend returns of said each asset included in the selected initial configuration; and,
the second respective dividend factor is a measure of dividend returns of said each asset included in the respective iteration configuration.

11. The computer-based method of claim 1, wherein determining the respective third score includes determining a respective variance for each next cooled configuration.

12. The computer-based method of claim 1, further comprising:
assigning a respective weight, from a range of weights, to each asset included in the next cooled configuration.

13. The computer-based method of claim 12, wherein determining the respective third score includes determining the respective third score according to a constraint limiting a sum of the respective weights to one.

14. The computer-based method of claim 1, further comprising:
assigning a respective dividend factor to each asset included in the next cooled configuration, wherein:
respective the respective dividend factor is a measure of dividend returns of said each asset included in the next cooled configuration.

15. The computer-based method of claim 1, wherein satisfying the fourth criterion includes the respective third score of the next cooled covariance matrix being less than the respective third score of the cooled configuration preceding the next cooled configuration in the second sequence.

16. The computer-based method of claim 1, wherein satisfying the fourth criterion includes the respective third score of the next cooled covariance matrix being greater than the respective third score of the cooled configuration preceding the next cooled configuration in the second sequence.

17. The computer-based method of claim 1, wherein satisfying the fourth criterion includes, depending on a fourth number of completed second sequences:
selecting a first option including the respective third score of the next cooled covariance matrix being less than the respective third score of the cooled configuration preceding the next cooled configuration in the second sequence; or,
selecting a second option including the respective third score of the next cooled covariance matrix being greater than the respective third score of the cooled configuration preceding the next cooled configuration in the second sequence.

18. The computer-based method of claim 17, further comprising, as the fourth number of completed second sequences increases, selecting the second option with decreasing frequency.

19. A computer-based method for construction of approximate minimum variance portfolios, comprising:
storing computer executable instructions in a memory element of a computer; and,
executing, using a processor for the computer, the computer readable instructions to:
obtain a plurality of asset return data for said each asset in a plurality of assets in said portfolio, the plurality of assets consisting of a first number of assets;
populate an initial estimated portfolio covariance matrix;
generate a plurality of initial configurations by successively populating respective covariance matrices with a second number of randomly selected assets included in the first plurality of assets and assigning first respective weights or first respective dividend factors to the randomly selected assets, the first respective dividend factors being measures of dividend returns of the second number of randomly selected assets;
determine respective first scores for the initial configurations;
calculate a first statistical function of the respective first scores;
select, from among the plurality of initial configurations, an initial configuration satisfying a first criterion with respect to the first statistical function;

generate, starting with the selected initial configuration, a plurality of iteration configurations by modifying an initial configuration by replacing a first asset with an asset from the plurality of assets and assigning second respective weights or second respective dividend factors to the modified iteration configurations, the second respective dividend factors being measures of dividend returns of assets in the modified iteration configuration;

determining a respective second score for each iteration configuration according to a constraint limiting a sum of the weights for the modified configuration to one;

calculate a second statistical function of the respective second scores;

calculate a third statistical function of the first and second statistical functions;

select, from among the plurality of iteration configurations, a starting cooled configuration satisfying a second criterion with respect to the third statistical function;

generate, starting with the selected iteration configuration, a plurality of cooled configurations by modifying a first cooled configuration by replacing a second asset with an asset from the plurality of assets when a respective third score for the modified cooled configuration satisfies a third criterion; and, when a fourth score for a first modified cooled configuration satisfies a fourth criterion, save, in the memory unit, the assets and respective weights or dividend factors of the assets for the cooled configuration as a recommended set of assets.

20. A computer-based apparatus for construction of approximate minimum variance portfolios, comprising:

a memory element of a computer configured to store computer executable instructions; and, a processor for the computer, configured to execute the computer readable instructions to:

obtain a plurality of asset return data for said each asset in a plurality of assets in a portfolio, the plurality of assets consisting of a first number of assets;

populate an initial estimated portfolio covariance matrix with the plurality of assets;

generate a plurality of initial configurations by:
populating respective covariance matrices with respective second numbers of randomly selected assets selected from the first plurality of assets; and, assigning at least one first respective financial parameter to respective assets included in the respective covariance matrices;

determine respective first scores for the plurality of initial configurations;

calculate a first statistical function of the respective first scores;

select, from among the plurality of initial configurations, a first initial configuration satisfying a first criterion with respect to the first statistical function;

generate a first iteration configuration by:
replacing at least one first asset in the selected initial configuration with at least one randomly selected second asset from the plurality of assets; and,
assigning at least one second respective financial parameter to each asset included in the selected initial configuration;

generate a plurality of iteration configurations by executing a first sequence including generating a respective iteration configuration by replacing, in an iteration configuration preceding the respective iteration configuration in the first sequence, at least one third asset with at least one randomly selected fourth asset from the plurality of assets and assigning the at least one second financial parameter to each asset included in the respective iteration configuration;

determine respective second scores for the plurality of iteration configurations;

calculate a second statistical function of the respective second scores;

calculate a third statistical function of the first and second statistical functions;

select, a first cooled configuration from among the plurality of iteration configurations, the first cooled configuration being an iteration configuration satisfying a second criterion with respect to the third statistical function;

starting with the first cooled configuration, execute the following second sequence:
determine a respective third score; and,
generate a next cooled configuration in the second sequence by replacing, in a cooled configuration preceding the next cooled configuration in the second sequence, at least one fifth asset with at least one randomly selected sixth asset from the plurality of assets when the respective third score for the second cooled configuration satisfies a third criterion; and, when a fourth score for a third cooled configuration satisfies a fourth criterion, save, in the memory unit, the assets and respective weights of the assets for the third cooled configuration as a recommended set of assets.

21. The computer-based apparatus of claim 20, wherein:
determine the respective first scores for the plurality of initial configurations includes determining respective variance for the plurality of initial configurations; or,
assigning the at least one first respective financial parameter to the respective assets included in the respective covariance matrices includes assigning respective initial portfolio weights to the respective assets included in the respective covariance matrices; or,
assigning the at least one first respective financial parameter to the respective assets included in the respective covariance matrices includes assigning respective dividend factors to the respective assets included in the respective covariance matrices, the respective dividend factors being measures of dividend returns of the respective assets included in the respective covariance matrices.

22. The computer-based apparatus of claim 20, wherein:
determine the respective second scores for the plurality of iteration configurations includes determining respective variances for the plurality of iteration configurations; or,
assigning the at least one second respective financial parameter to said each asset included in the selected initial configuration includes assigning a respective weight, from a range of weights, to said each asset included in the selected initial configuration; or,
assigning the at least one second respective financial parameter to said each asset includes assigning a respective weight, from a range of weights, to said each asset included in the selected initial configuration.

23. The computer-based apparatus of claim 20, wherein determine the respective second scores for the plurality of iteration configurations includes determining the respective second scores according to a constraint limiting a sum of the weights to one.

24. The computer-based apparatus of claim 20, wherein:
assigning the at least one second respective financial parameter to said each asset included in the selected initial configuration includes assigning a first respective dividend factor to said each asset included in the selected initial configuration; or,
assigning the at least one second respective financial parameter to said each asset included in the selected initial configuration includes assigning a second respective dividend factor to said each asset included in the respective iteration configuration;
the first respective dividend factor is a measure of dividend returns of said each asset included in the selected initial configuration; and,
the second respective dividend factor is a measure of dividend returns of said each asset included in the respective iteration configuration.

25. The computer-based apparatus of claim 20, wherein:
determining the respective third score includes determining a respective variance for each next cooled configuration; or,
the processor is configured to execute the computer readable instructions to assign a respective weight, from a range of weights, to each asset included in the next cooled configuration; or,
the processor is configured to execute the computer readable instructions to assign a respective dividend factor to each asset included in the next cooled configuration, the respective dividend factor being a measures of dividend returns of said each asset included in the next cooled configuration.

26. The computer-based apparatus of claim 25, determining the respective third score includes determining the respective third score according to a constraint limiting a sum of the respective weights to one.

27. The computer-based apparatus of claim 20, wherein satisfying the fourth criterion includes the respective third score of the next cooled covariance matrix being less than the respective third score of the cooled configuration preceding the next cooled configuration in the second sequence.

28. The computer-based apparatus of claim 20, wherein satisfying the fourth criterion includes the respective third score of the next cooled covariance matrix being greater than the respective third score of the cooled configuration preceding the next cooled configuration in the second sequence.

29. The computer-based apparatus of claim 20, wherein satisfying the fourth criterion includes, depending on a fourth number of completed second sequences:
selecting a first option including the respective third score of the next cooled covariance matrix being less than the respective third score of the cooled configuration preceding the next cooled configuration in the second sequence; or,
selecting a second option including the respective third score of the next cooled covariance matrix being greater than the respective third score of the cooled configuration preceding the next cooled configuration in the second sequence.

30. The computer-based apparatus of claim 29, wherein the processor is configured to execute the computer readable instructions to select the second option with decreasing frequency as the fourth number of completed second sequences increases.

* * * * *